United States Patent [19]

Stevanovich

[11] Patent Number: 4,993,935
[45] Date of Patent: Feb. 19, 1991

[54] BEAD FORMER AND LOOSENER FOR DIPPING MACHINE

[75] Inventor: Srbo M. Stevanovich, Akron, Ohio

[73] Assignee: ACC Automation, Inc., Akron, Ohio

[21] Appl. No.: 396,080

[22] Filed: Aug. 21, 1989

[51] Int. Cl.⁵ ............................................ B29C 41/14
[52] U.S. Cl. ..................................... 425/270; 425/274
[58] Field of Search ........................ 425/269, 270, 274

[56] References Cited

U.S. PATENT DOCUMENTS

| 1,658,011 | 1/1928 | Unger | 425/269 X |
| 2,482,418 | 9/1949 | Jenkins | 425/274 X |
| 3,304,576 | 2/1967 | Keesling et al. | 425/274 |
| 3,655,317 | 4/1972 | Funkhouser et al. | 425/274 X |
| 4,449,911 | 5/1984 | Brasfiel | 425/274 X |

*Primary Examiner*—Richard L. Chiesa
*Attorney, Agent, or Firm*—Pearne, Gordon, McCoy & Granger

[57] ABSTRACT

A mechanism for producing the bead on a rubber article made by a dipping process first loosens the rubber film on the form using a pair of looseners in the form of roller brushes which contact the lower portion of each form as the forms are moving along on the form carriage. As the forms move along on the form carriage, the looseners move in the same direction as the form carriage but at a different speed, so that the roller brushes roll around the entire circumference of the lower portion of each form to thoroughly loosen the edge of the rubber film from the form. Following the loosening operation, the beads are formed by a separate bead roller mechanism which provides a bead of predetermined dimensions by rolling up the edge of the film a predetermined amount. The bead rolling operation is accomplished by a pair of roller brushes which are mounted diagonally with respect to the direction of travel of the form carriage.

16 Claims, 12 Drawing Sheets

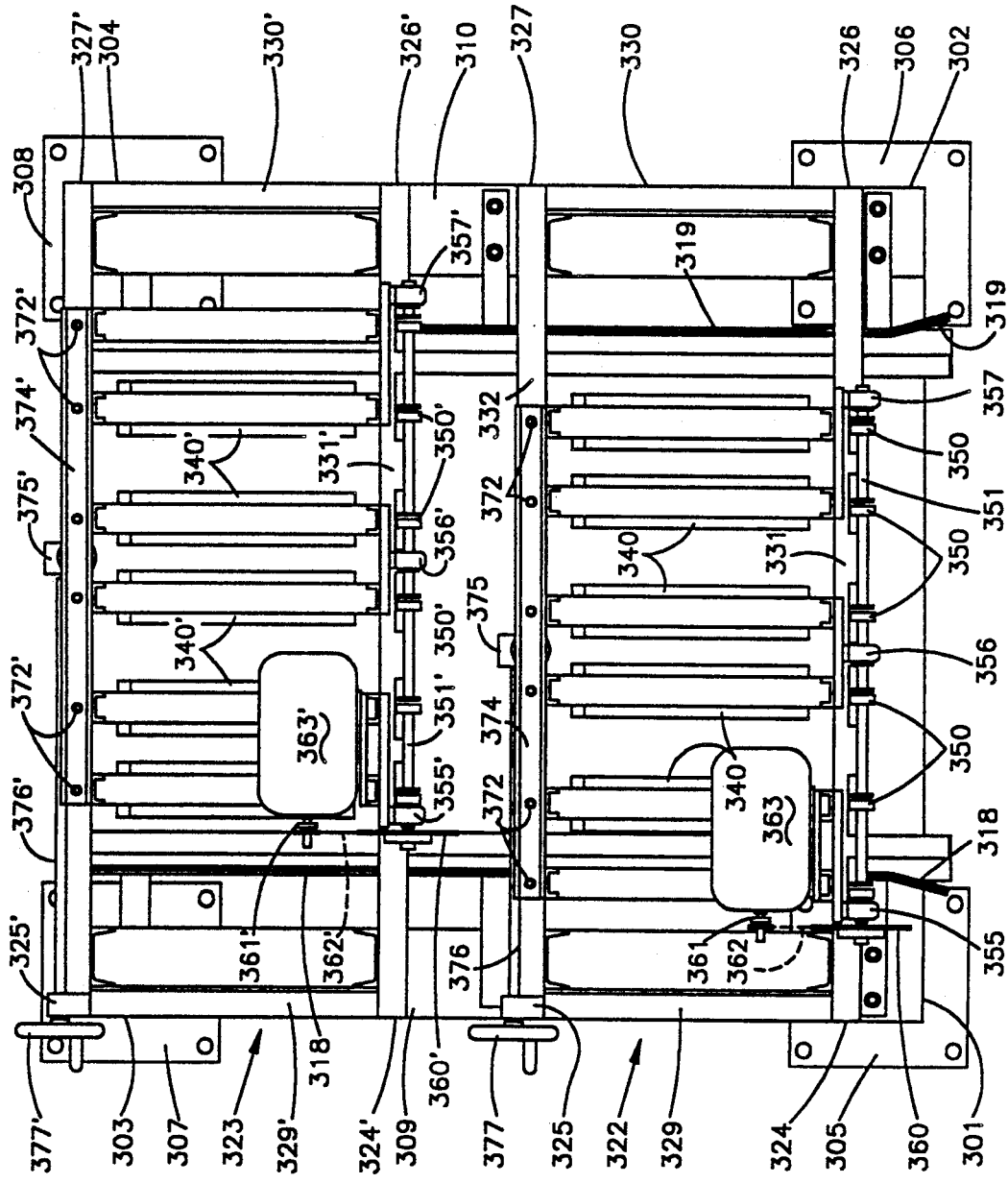

BEAD FORMER AND LOOSENER FOR DIPPING MACHINE

BACKGROUND OF THE INVENTION

1. Field of the Invention

This invention relates to apparatus for making rubber gloves and other products of latex rubber using a dipping process, and more particularly to apparatus for producing beads around the edges of the products so formed.

2. Description of the Prior Art

The manufacture of various thin latex rubber products, such as household rubber gloves, medical or surgical gloves, balloons, condoms and the like, use a dipping process in which a form having the shape of the article to be made is dipped into a bath of liquid latex rubber to produce a thin film of rubber on the form. The form is then removed from the bath and may be further processed as necessary prior to curing. After this processing, the form with the uncured rubber thereon is cured in an oven, following which the finished article is removed from the form.

There are various problems associated with the forming of thin rubber articles by this method. One problem involves the formation of a bead or lip on the finished article. Particularly with articles such as rubber gloves, it is desirable to have a bead or lip around the opening in the glove to make it easier to slip on or remove the glove without ripping it. These beads are somewhat difficult to achieve, however, because the dipping process provides a uniform thin film of rubber over the entire form. Therefore, the bead or lip must be formed after the form has been removed from the bath and prior to final curing.

The bead is most easily formed by rolling up a portion of the rubber film from the opening to form the bead. However, heretofore there has not been any apparatus available for easily forming this bead in an automated manner so that a uniform and consistent amount of the rubber film is rolled up to form the bead without operator assistance.

One of the problems in forming the bead involves the loosening of the edge of the article so that the film can be rolled up. The uncured rubber is tacky and is often adhered to the form, making it difficult to begin rolling up the rubber film because the edge of the film will not easily come loose.

Thus it would be desirable to provide a means for effectively loosening the rubber film from bottom of the form so that a bead can be formed, and to then provide a means for automatically forming this bead after the film has been loosened.

SUMMARY OF THE INVENTION

These and other problems are solved by the present invention. The present invention provides a means for producing the bead on a rubber article made by a dipping process, in which the rubber film around the bottom of the article is automatically and effectively loosened from the form on which the article is being made and in which the bead is automatically produced after loosening.

The present invention effectively provides the desired loosening action while the forms are moving along on the form carriage without the necessity of stopping the form carriage or otherwise interrupting the continuous production of the articles. The loosening is accomplished by a pair of looseners in the form of star-shaped scrubbers which contact the lower portion of each form as the forms are moving along on the form carriage. The looseners are also preferably agitated or vibrated by an oscillating mechanism to assist in loosening the edge of the film. As the forms move along on the form carriage, the looseners move in the same direction as the form carriage but at a different speed, so that the scrubbers roll around the entire circumference of the lower portion of each form to thoroughly loosen the edge of the rubber film from the form.

The looseners are supported on a loosener frame, and the loosener frame is transported in the same direction as the form carriage by a drive latch assembly. The drive latch assembly includes a latch mechanism which engages a portion of the form carriage and is carried along with it. When the looseners complete their loosening operation, the scrubbers which comprise the looseners are moved away from the forms by a camming mechanism. When the drive latch assembly reaches the end of its travel, it contacts a plunger which releases the latch and disengages the drive latch assembly from the form carriage. A motor is provided to move the drive latch assembly back to the starting position, where it contacts another plunger to latch the latch mechanism and re-engage the drive latch assembly with the form carriage.

The loosener frame is connected to the drive latch assembly by a connecting drive means, which is preferably a chain drive having sprocket wheels of different sizes so that the loosener frame moves along with the drive latch assembly, but at a slower speed.

Following the loosening operation, the beads are formed by a separate bead roller mechanism which provides a bead of predetermined dimensions by rolling up the edge of the film a predetermined amount. The bead rolling operation is accomplished by a pair of roller brushes which are mounted diagonally with respect to the direction of travel of the form carriage. The pair of roller brushes contact the lower portion of the form where the rubber film has just been loosened and begin to roll the film up the form to make the bead. The position of the roller brushes is preferably vertically adjustable, so that the amount of film rolled up to make the bead is adjustable. After the bead has been properly made, the forms then pass to the curing oven, so that the finished article is cured with the bead in place.

These and other advantages are achieved by the present invention of a bead forming assembly for articles on forms moving on a form carriage assembly. The bead form assembly comprises a fixed frame through which the form carriage assembly moves. A pair of roller brushes is supported on the fixed frame and engages one of the forms. One roller brush is on each side of the form. The roller brushes are mounted diagonally with respect the direction of travel of the forms on the form carriage assembly. Means are provided for rotating the pair of roller brushes in opposite directions as the roller brushes engage the form to produce a bead on the article.

In accordance with another aspect of the present invention, a loosening assembly is provided for loosening articles on forms moving on a form carriage assembly. The loosening assembly comprises a fixed frame through which the form carriage assembly moves. Means are provided for loosening the articles from the forms. The loosening means includes a loosener frame assembly supported on the fixed frame and movable in the same direction as the forms are moving on the form carriage assembly. The loosener frame assembly is movable between a starting position and an ending position. The loosening means also includes a plurality of looseners supported on the loosener frame assembly. Each of the looseners is adapted for engaging one of the forms. Drive means is provided for moving the loosener frame assembly from the starting position to the ending position at a speed different from speed at which the form carriage assembly is moving to allow the looseners to move around the forms as the forms move and loosen the articles from the forms. Means are provided for returning the loosener frame assembly from the ending position to the starting position.

BRIEF DESCRIPTIONS OF THE DRAWINGS

FIG. 12 is a top plan view of the bead roller assembly of FIGS. 10 and 11 taken along line 12—12 of FIG. 10.

DETAILED DESCRIPTION OF THE PREFERRED EMBODIMENT

Figure 1:
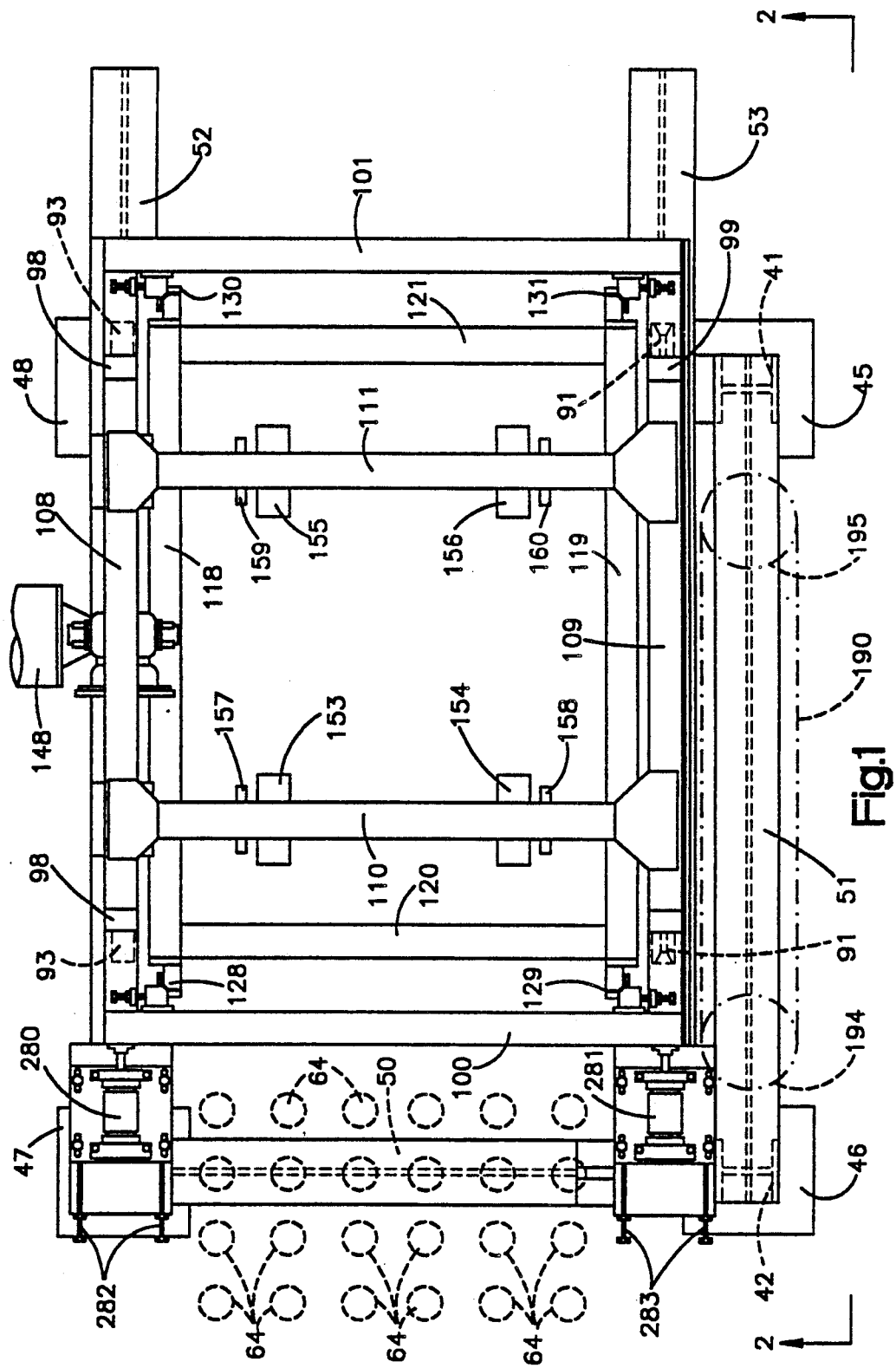
FIG. 1 is a top plan view of the loosening assembly of the present invention.
Figure 2:
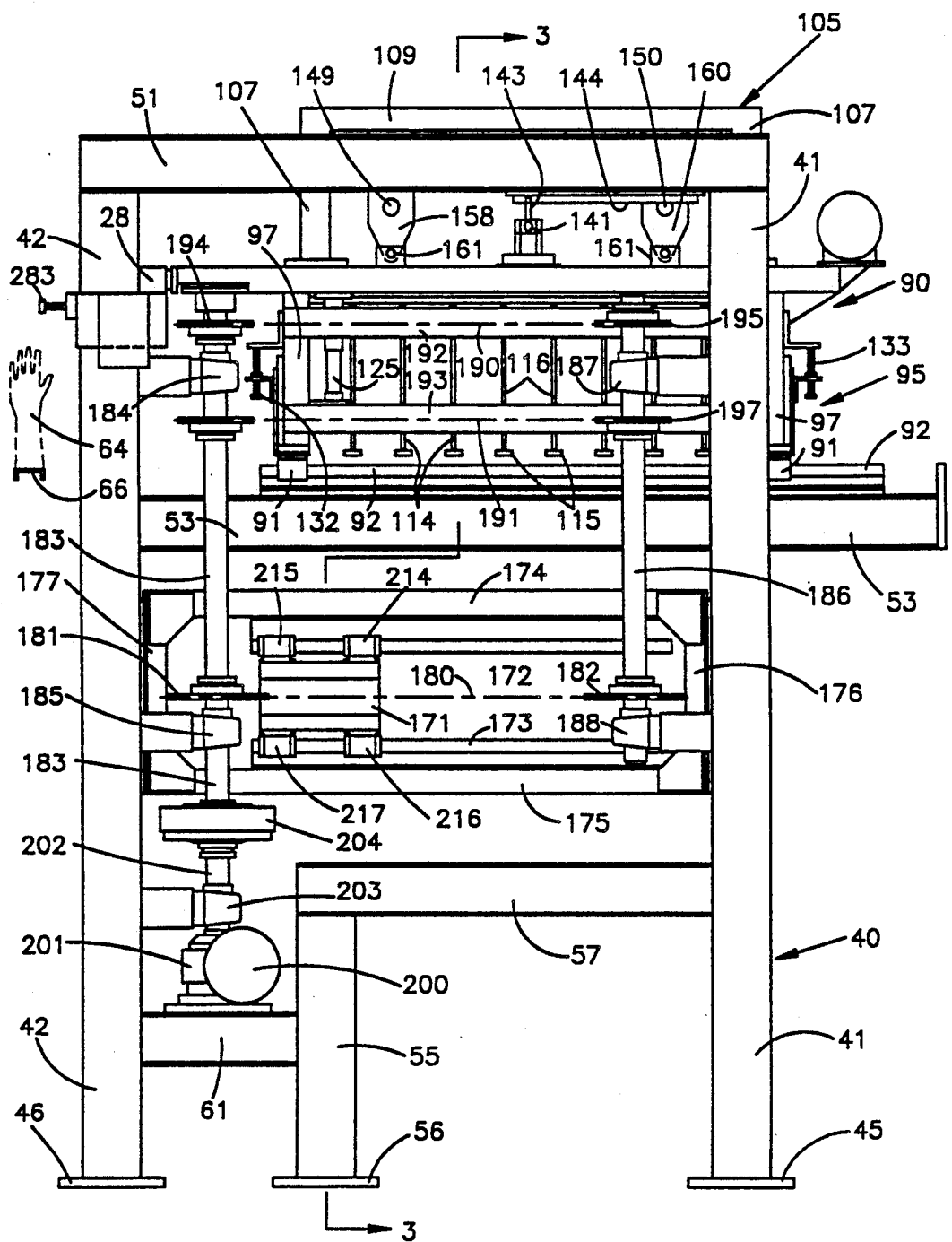
FIG. 2 is a side elevational view taken along line 2—2 of FIG. 1.
Figure 3:
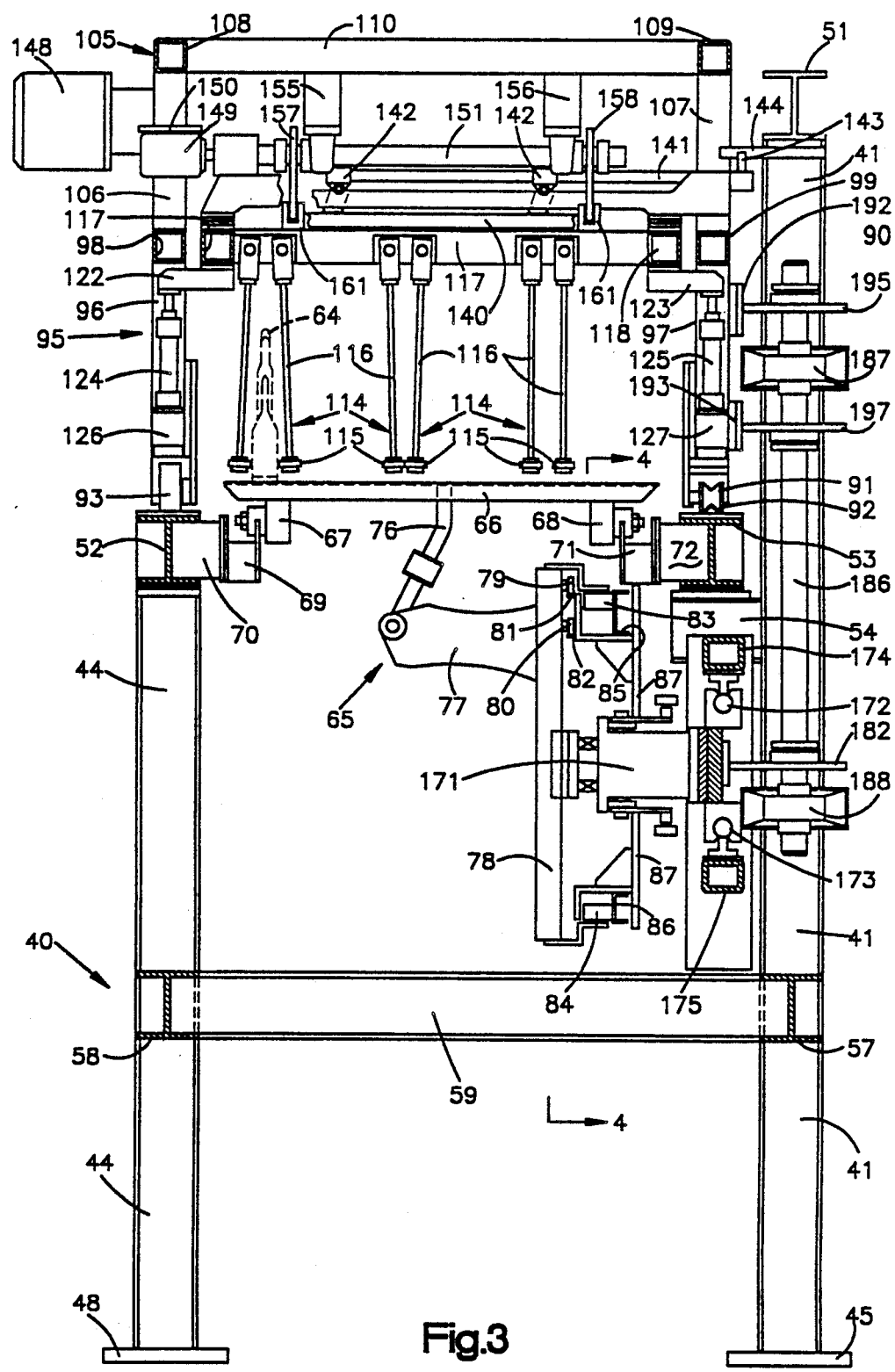
FIG. 3 is an end sectional view taken along line 3—3 of FIG. 2.

Referring more particularly to the drawings and initially to FIGS. 1-3, there is shown the loosening assembly of the present invention. The invention is shown herein with particular application to gloves, although the invention can be used for any thin rubber article formed by a dipping process, such as balloons, condoms, and the like.

Forms from the dip bath are carried on a movable form carriage assembly. As shown in the embodiment of the present invention, the forms are carried in continuous lines, with six across in each row, although other configurations could be used. The forms are dipped into the bath to provide an even coating of the rubber on each form. The form carriage assembly then carries the forms from the bath as the rubber film begins to set.

At this point it is desirable to roll up a portion of the rubber film at the bottom of the form to make a bead. However, the freshly set rubber is tacky and usually adheres to the form, making it difficult to begin rolling the film up to make the bead. Therefore, the forms pass through a loosening assembly shown in FIGS. 1-5, in order to loosen the rubber film from the lower portion of each form.

The loosening assembly includes a lower support frame 40 (FIGS. 2 and 3) comprising two pairs of vertical support columns 41, 42, 43 and 44, each mounted on a base 45, 46, 47 and 48, respectively (FIGS. 1-3). A horizontal support girder 50 (FIG. 1) extends between the columns 42 and 43. The columns 41 and 42 are connected across the top by a horizontal support girder 51 (FIG. 2). Extending horizontally across the top of the shorter columns 43 and 44 is a horizontal support girder 52 (FIG. 3). A similar horizontal support girder 53 (FIGS. 2 and 3) extends opposite the girder 52. The girder 53 is supported on members 54 (FIG. 3) attached to the columns 41 and 42.

Figure 5:
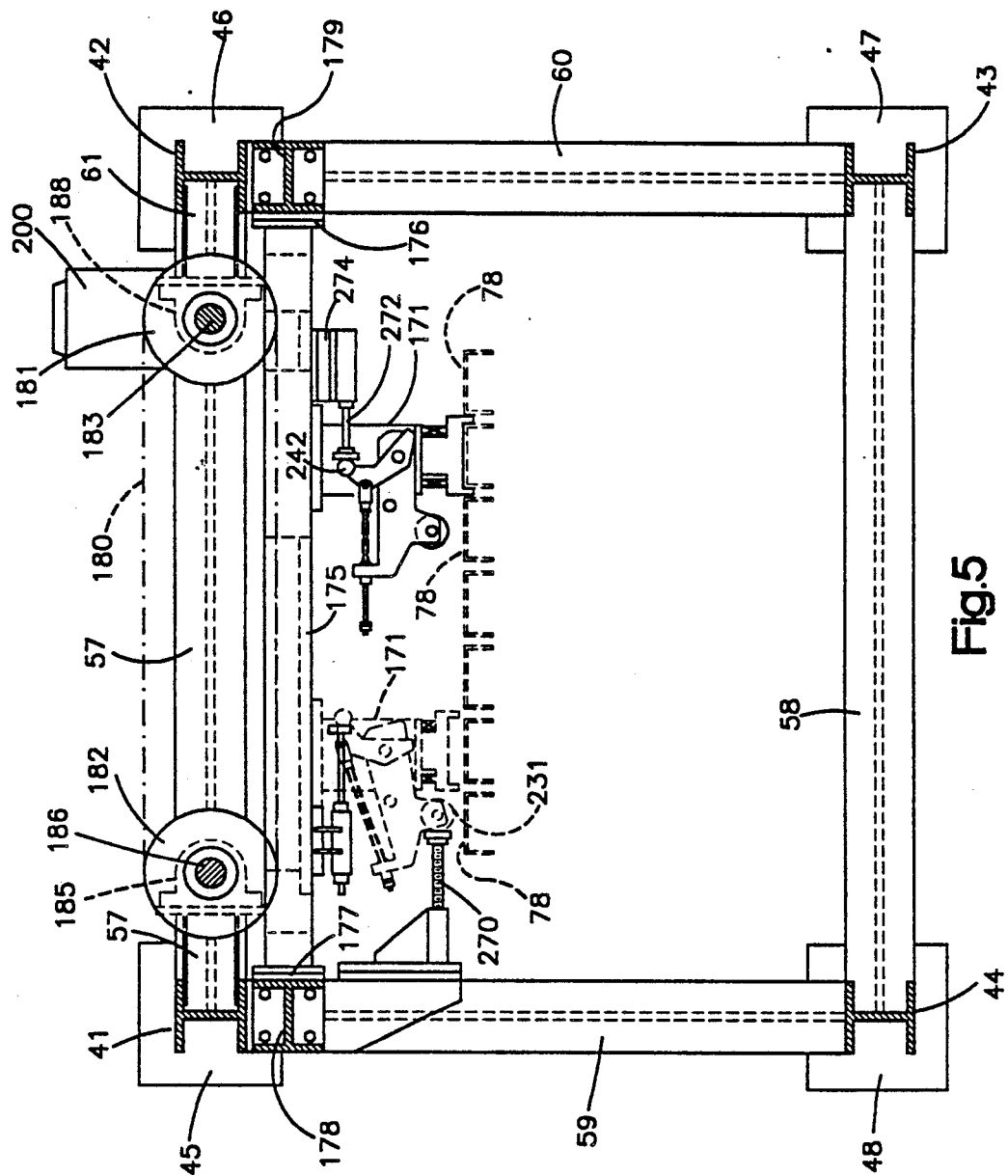
FIG. 5 is a top sectional view showing the drive latch assembly taken along line 5—5 of FIG. 4.

The loosener assembly also includes an additional pair of vertical support columns 55 (FIG. 2), each mounted on a base 56. Each of the vertical support columns 55 supports one of two longitudinal horizontal girders 57 and 58 (FIGS. 3 and 5). The other end of each of the horizontal girders 57 and 58 is supported by the columns 41 and 14, respectively. The pair of girders 57 and 58 support transverse horizontal beams 59 and 60 (FIGS. 3 and 5). A support beam 61 (FIG. 2) is also provided between the support column 55 and the support column 42.

The individual glove forms 64 are carried in an upright vertical position on a form carriage assembly 65 (FIG. 3). The form carriage assembly 65 includes a plurality of narrow slats or tables 66, each of which has six forms 64 arranged in a row. As shown in FIG. 3, the tables 66 are supported on each side by a belt carried by rollers 67 and 68. The rollers 67 on one side of the assembly are mounted on a horizontal support beam 69 which extends horizontally inside the support girder 52 and is attached to the girder 52 by members 70. The rollers 68 on the other side are mounted on a horizontal support beam 71 which extends horizontally inside the support girder 53 and is attached to the girder 53 by members 72. 18 The form carriage assembly 65 also comprises means for moving the tables 66, as shown in FIG. 3. At the bottom of each table 66 is an arm 76. Each arm 76 is connected to a member 77 which extends horizontally from a vertical track 78. The track 78 is supported vertically by rollers 79 and 80 which ride on rails 81 and 82, and is supported horizontally by rollers 83 and 84 which ride on rails 85 and 86. The track 78 is held in position by guides 83 and 84. The rails 81, 82, 85 and 86 are attached to a plate 87 which is supported on a stanchion assembly (not shown). The stanchion assembly extends along the entire length of the glove making process from the dip to final removal and provides the means for supporting and moving the form carriage assembly.

In accordance with the present invention, the lower portions of the gloves on the forms 64 are loosened by a plurality of brush looseners supported on a loosener frame assembly 90 which is, in turn, supported on the lower support frame 40. The loosener frame assembly go moves horizontally back and forth on the lower support frame 10 in the direction in which the forms 64 are being moved through the loosening assembly by the form carriage assembly 65. The loosener frame assembly 90 is supported for horizontal movement on the lower support frame 40 on one side by a pair of grooved wheels 91 (FIGS. 2 and 3) which travel on top of a rail 92 supported on the girder 53, and on the other side on a pair of flat wheels 93 (FIG. 3) which ride on top of the girder 52.

The wheels 91 and 93 are connected to support the lower portion 95 of the loosener frame assembly 90. Each of the wheels 93 supports a vertical frame member 96 (FIG. 3), while each of the wheels 91 supports a vertical frame member 97 (FIGS. 2 and 3). The tops of the two vertical frame members 96 are connected by a horizontal frame member 98 (FIGS. 1 and 3). and the tops of the two vertical frame members 97 are connected by a horizontal frame member 99. Transverse horizontal frame members 100 and 101 (FIG. 1) extend between the ends of the horizontal frame members 98 and 99. Supported on the horizontal frame members 98 and 99 is the upper portion 105 of the loosener frame assembly 90. The upper portion 105 comprises vertical frame members 106 (FIG. 3) which extend upwardly near the top of each of the vertical columns 96, and vertical frame members 107 (FIGS. 2 and 3) which extend upwardly near the top of each of the vertical columns 97. The vertical frame members 106 and 107 are connected together by parallel horizontal frame members 108 and 109 (FIGS. 1 and 3) and transverse horizontal frame members 110 and 111.

Figure 9:
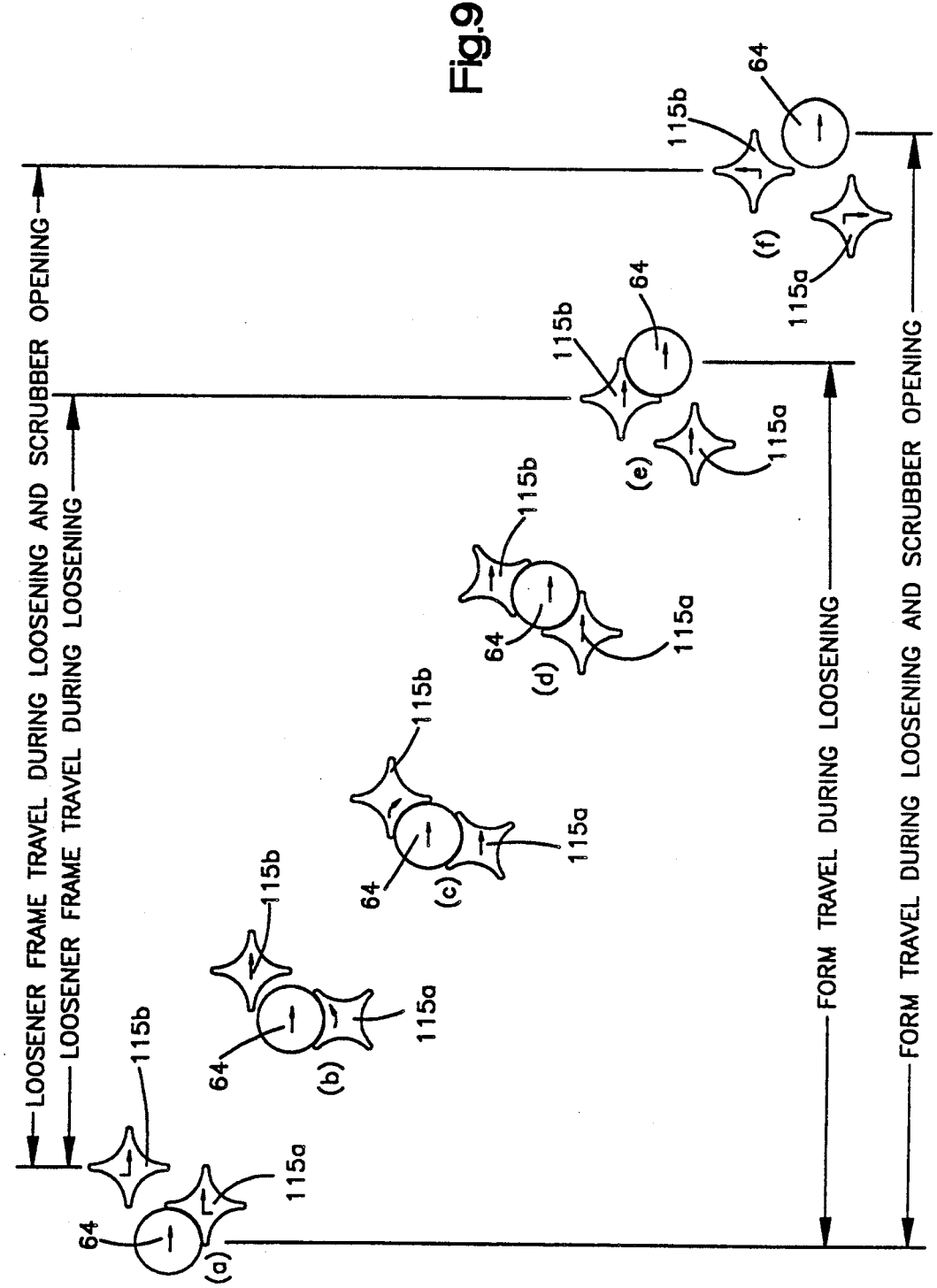
FIG. 9 is a schematic view showing the position of the forms and the looseners at various stages of the loosening operation.

As shown in FIG. 3, each of the gloves is loosened by a pair of looseners 114 each comprising a star-shaped scrubber 115 which engages one side of the lower portion of one of the forms 64. As shown in FIG. 9, each of the scrubbers 115 is shaped generally like a four-pointed star, and the scrubbers of each pair of scrubbers are longitudinally offset with respect to each other, so that one scrubber (designated 115a in FIG. 9) of each pair of scrubbers engages the form 61 first before the other scrubber (designated 115b in FIG. 9) of the pair engages the form. Likewise, first scrubber 115a of each pair finishes engaging the form 64 before the second scrubber 115b finishes.

In each of the looseners 114, the scrubber 115 is mounted for rotation at the bottom of a wand 116 The wands 116 in each pair of looseners 114 are normally biased together so that the scrubbers 115 at the bottom of the wands are firmly in contact with the form 64. As shown in FIG. 3, three pairs of looseners 114 are provided in a row to engage three of the six forms 64 in the row. The other three forms 64 in the row are engaged by other looseners located downstream from the looseners 114 shown in FIG. 3 and laterally offset from the looseners 114 of FIG. 3 in order to be positioned to engage these forms.

The tops of the wands 116 are mounted on cross members 117 which extend between horizontal frame members 118 and 119. Transverse horizontal frame members 120 and 121 (FIG. 1) extend between the ends of the horizontal frame members 118 and 119. The horizontal frame members 118, 119, 120 and 121 are supported on the members 122 and 123 (FIG. 3) which are, in turn, mounted on top of piston rods extending upwardly from shock-absorbing fluid cylinders 124 and 125. The fluid cylinders 124 and 125 are supported on members 126 and 127, respectively. Each member 126 is attached to one of the vertical frame members 96, and each member 127 is attached to one of the vertical frame members 97.

The upper portion 105 of the loosener frame assembly 90 thus rides on the lower portion 95 of loosener frame assembly by being vertically supported on the shock-absorbing fluid cylinders 124 and 125. Additional support in the horizontal direction is provided by adjustable slide blocks 128, 129, 130 and 131 (FIG. 1) mounted between the transverse horizontal frame members 100 and 101 and the transverse horizontal frame members 120 and 121. The height of the upper portion 105 of the loosener frame assembly with respect to the lower portion 95 of the loosener frame assembly is adjusted by adjustment screws 132 and 133 (FIG. 2).

While each pair of looseners 114 is normally biased together so that the scrubbers 115 are firmly in contact with the form 64, it is necessary to open the looseners 114 and move them away from the forms 64 after the looseners complete their loosening operation, so that the loosener frame assembly can be returned to its starting position. To provide the scrubber opening action, the tops of the wands 116 are connected to a cross bar 140 (FIG. 3) which is capable of transverse movement to move the wands apart. The cross bar 140 is connected to a bar 141 by cross links 142, so that as the bar 141 is moved transversely across the assembly, the looseners are opened. As the loosener frame assembly is moved along in the direction that the forms 64 are traveling, a cam 143 on the end of the bar 141 engages a camming plate 144 (FIGS. 2 and 3) mounted beneath the horizontal support girder 51. This causes the bar 141 to move transversely, opening the looseners 114.

During the loosening operation, the looseners 114 are agitated by a vibrating mechanism powered by a motor 148 (FIGS. 1 and 3) which is mounted on the upper portion 105 of the loosener frame assembly 90, and which is connected to speed reducer 149 (FIG. 3) mounted on a plate 150 extending between the vertical frame members 106. The motor 148 is preferably a 5 hp motor having a 1,725 rpm output, and the speed reducer 149 preferably provides a 7.5:1 reduction, resulting in a 230 rpm output. The speed reducer 149 drives two rotatable shafts 151 and 152 (FIG. 2) which are suspended in shaft supports 153, 154, 155 and 156 (FIG. 1) which extend beneath the transverse horizontal frame members 110 and 111, respectively. A pair of eccentric yokes 157 and 158 (FIGS. 1 and 3) are mounted over the shaft 151 each adjacent to one of the shaft supports 153 and 154, and a pair of eccentric yokes 159 and 160 (FIG. 1) are mounted over the shaft 152 each adjacent to one of the shaft supports 155 and 156. The bottom of each of the eccentric yokes 157, 158, 159 and 160 is pivotally connected to a bracket 161 (FIGS. 2 and 3) mounted on top of one of the cross members 117, so that as the shafts 151 and 152 rotate, the eccentricity of the yokes 157, 158, 159 and 160 causes the cross members 117 to move up and down in a vibratory manner.

As previously discussed, the loosener frame assembly 90 is movable horizontally on the top of the lower support frame 40 in the direction of travel of the forms 64. The loosener frame assembly 90 is moved in one direction by a drive latch assembly 170 located below the travel path of the forms 64.

As shown in FIGS. 2 and 3, the drive latch assembly 170 includes a latch carriage 171 carried on a pair of support rails 172 and 173. The upper rail 172 is supported on a horizontal support 174, and the lower rail 173 is supported on a horizontal support 175. As shown in FIG. 2, the supports 174 and 175 form the horizontal elements of a frame, the vertical elements of which are vertical members 176 and 177. The vertical frame members 176 and 177 are mounted on vertical girders 178 and 179 (FIG. 6) mounted on the columns 41 and 42, respectively.

A chain 180 (FIG. 2) is attached to the back of the latch carriage 171. The chain 180 extends between two sprocket wheels 181 and 182. The sprocket wheel 181 is mounted on a vertically extending shaft 183 which is mounted for rotation in supports 184 and 185 mounted on the column 42. The sprocket wheel 182 is mounted on a vertically extending shaft 186 which is mounted for rotation in supports 187 and 188 mounted on the column 41.

Two other chains 190 and 191 (FIG. 2) are attached to support plates 192 and 193, respectively, on the side of the loosener frame assembly 90. The chain 190 extends between a sprocket wheel 194 mounted on the shaft 183 and a sprocket wheel 195 on the shaft 186. The chain 191 extends between a sprocket wheel 196 mounted on the shaft 183 and a sprocket wheel 197 on the shaft 186. The sprocket wheels 194, 195, 196 and 197 are all the same size but are each smaller in diameter than the sprocket wheels 181 and 182.

Thus, as the drive latch assembly 170 moves horizontally, it moves the chain 180 causing the shafts 183 and 186 to rotate, moving the chains 192 and 193, resulting a corresponding horizontal movement of the loosener frame assembly 90 matching that of the drive latch assembly 171. However, because the sprocket wheels 194, 195, 196 and 197 are smaller in diameter than the sprocket wheels 181 and 182, the loosener frame assembly 90 moves at a slower speed at a specific rate that will be described later.

The return movement of the loosener frame assembly 90 back in the direction opposite the direction of movement of the forms 64 is powered by a motor 200 (FIGS. 2 and 5) mounted near the bottom of loosening assembly near the support beam 61. Preferably, the motor is a 3 hp motor having a 1,725 rpm output. The motor 200 is connected to a speed reducer 201 mounted on the support beam 61. The speed reducer 201 (FIG. 2) preferably provides a 25:1 reduction, so that with a 1,725 rpm input, it provides a 69 rpm output.

A shaft 202 extends upwardly from the speed reducer 201, and is mounted for rotation in a support 203 which is mounted on the column 42. The shaft 202 is selectively connected to the shaft 183 through a clutch 204, so that the power of the motor 200 can be used as desired to rotate the shaft 183 and return the loosener frame assembly 90 to its starting position following its movement by the drive latch assembly 170.

Figure 6:
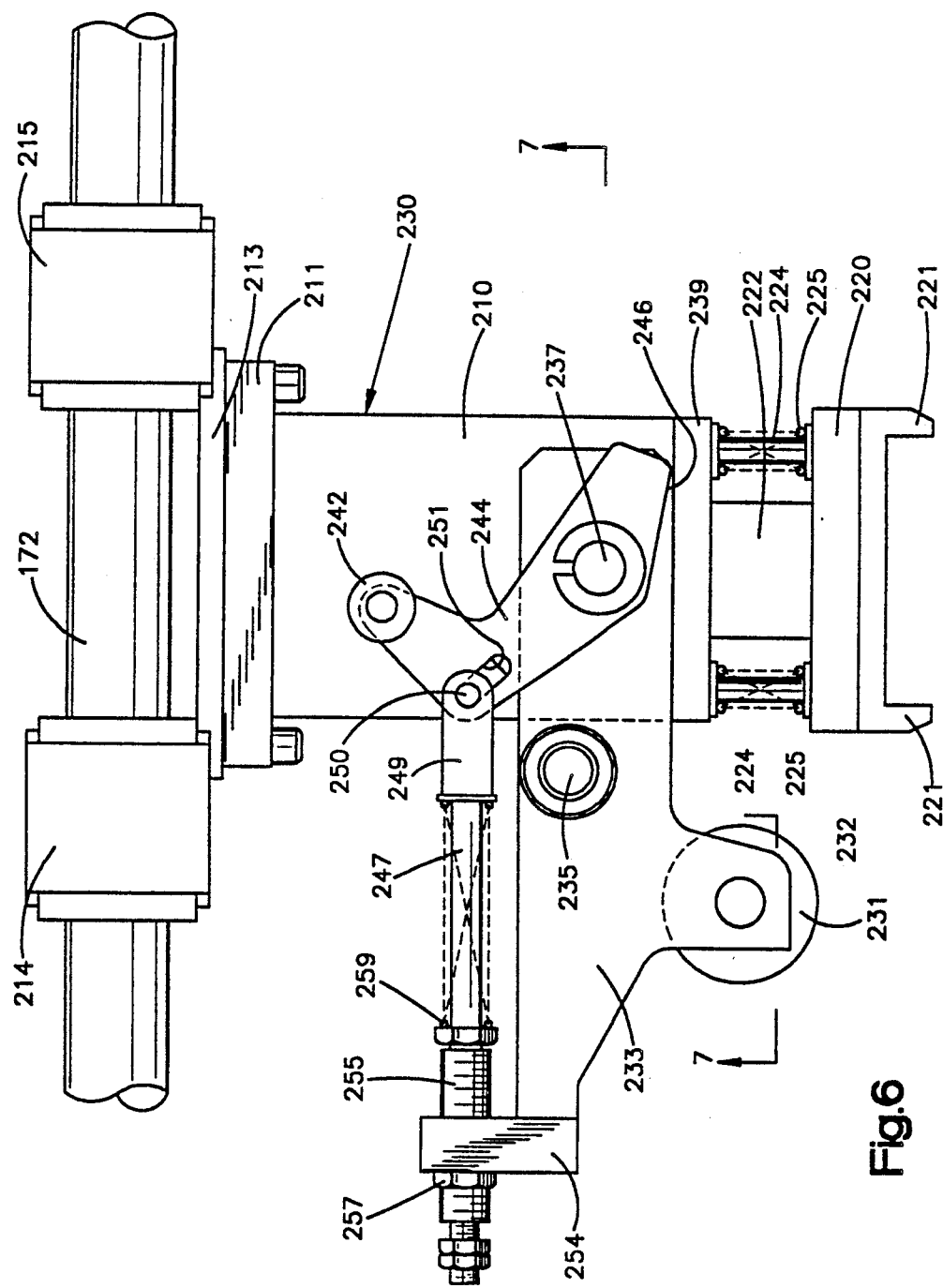
FIG. 6 is top plan view showing the latch carriage of FIG. 5 to a larger scale.

The operation of the drive latch assembly 170 can be explained in more detail with reference to FIGS. 6, 7 and 8. The drive latch assembly 170 includes the latch carriage 171 having a body 210 which is mounted by means of plates 211 and 212 (FIG. 8) to a support member 212. The support member 213 is attached to the support rails 172 and 173 by sleeves 214, 215, 216 and 217 (FIGS. 2, 6 and 8). On the back of the support member 213 opposite the latch body 210 is a chain mounting member 218 (FIG. 8) which engages the chain 180. The chain 180 in turn is mounted on the sprocket wheels 181 and 182, which are mounted on the shafts 183 and 186, as previously described.

The latch body 210 supports a track engager 220 (FIGS. 6 and 8) on the end of the body opposite the support member 213. The projecting end of the track engager 220 has fingers 221 (FIG. 6) adapted to engage the end of one of the vertical tracks 78 as the form carriage assembly 65 is moved through the loosening assembly. The other end of the track engager 220 is slidably attached to the latch body 210 by a slide member 222 (FIGS. 6, 7 and 8) which is horizontally movable within a cavity 223 (FIG. 8) formed in the latch body, and by slide rods 224 (FIGS. 6 and 8) which extend into the latch body and into the track engager, so that the track engager is slidably movable outwardly away from the latch body.

When the slide member 222 is fully extended, as shown in FIG. 6, the track engager 220 is urged outwardly away from the latch body by springs 225 mounted on the rods 224. Also inside the cavity 223 in the latch body 210 is a spring 226 (FIG. 8) mounted on a post 227 which also urges the slide member 222 outwardly, As shown in FIG. 5, when the slide rods 224 are extended and the track engager 220 is urged outwardly by the springs 225 and 226, the track engager 220 engages the end of one of the vertical tracks 78.

The track engager 220 is retracted inwardly toward the latch body 210 by a latch 230. The latch 230 includes a bumper stop 231 (FIGS. 6 and 7) which is mounted on a shaft 232 which is mounted between two pivot arms 233 and 234 (FIGS. 6, 7 and 8). The pivot arms 233 and 234 are attached to the top and bottom, respectively, of the latch body 210 by a pivot shaft 235 (FIGS. 6 and 7) which extends through a block 236 (FIG. 7) attached to the side of the latch body 210. The pivot arms 233 and 234 are also attached to the latch body 210 by a pivot shaft 237 (FIGS. 6, 7 and 8) which extends through the latch body within a elongated slot 238 (FIG. 8) formed in the latch body. As the pivot arms 233 and 234 move about the pivot shaft 235, they move the slide shaft 237 toward and away from the support member 213. Movement of the pivot arms 233 and 234 is limited by a camming plate 239 (FIGS. 6 and 8) attached to the forward end of the latch body 210 adjacent to the track engager 220 and extending above the top and bottom surfaces of the body.

A pair of second bumper stops 242 and 243 (FIGS. 6, 7 and 8) are also provided one mounted on the end of each of two identical L-shaped latch arms 244 and 245. The L-shaped latch arms 244 and 245 are also attached to the top and bottom, respectively, of the latch body 210 by the slide shaft 237. The end of each of the L-shaped latch arms 244 an 245 opposite the bumper stops 242 and 243 provides a camming surface 246 (FIG. 6) which engages the camming plate 239 as the L-shaped latch arm is moved. The pivot arm 233 is connected to the L-shaped latch arm 244 by an adjustable connecting member 247 (FIGS. 6 and 7), and the pivot arm 234 is connected to the L-shaped latch arm 245 by an identical adjustable connecting member 248 (FIG. 7).

Figure 7:
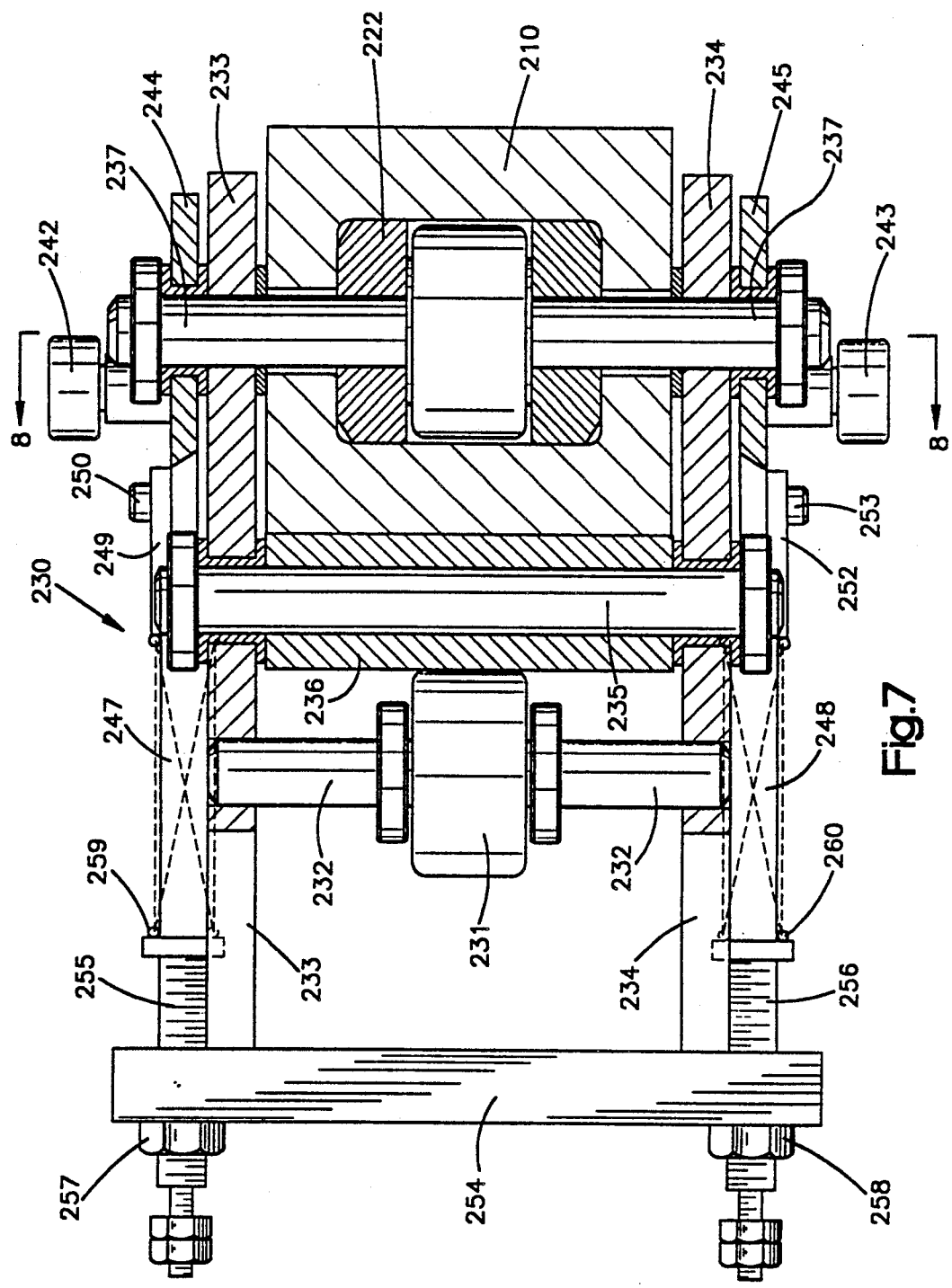
FIG. 7 is a side sectional view taken along line 7—7 of FIG. 6.
Figure 8:
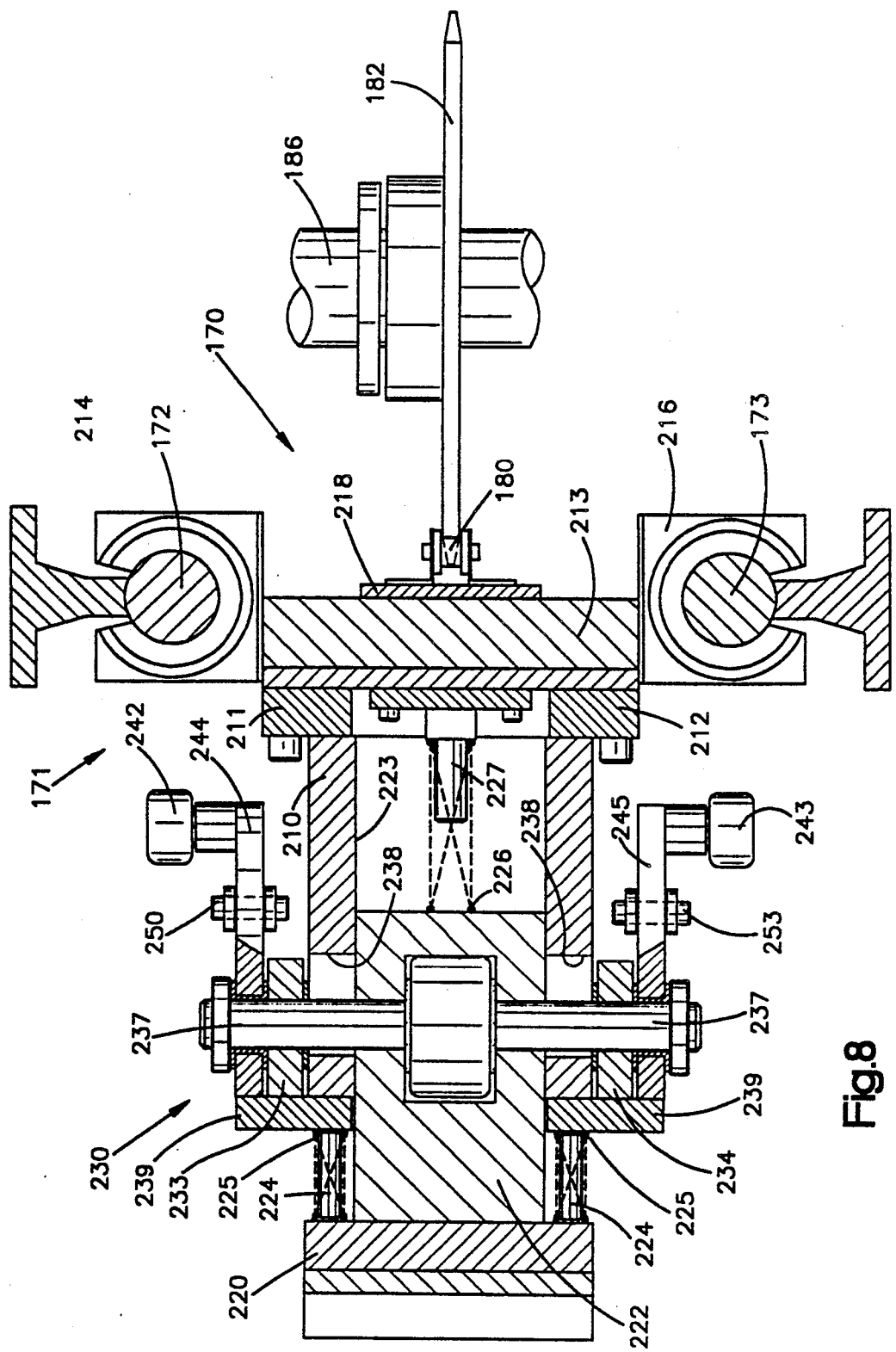
FIG. 8 is an end sectional view taken along line 8—8 of FIG. 7.

Attached to one end of the connecting member 247 is a bracket 249 (FIGS. 6 and 7) which permits the connecting member to be pivotally mounted to the L-shaped latch arm 244 by a pin 250 (FIGS. 6, 7 and 8). The pin 250 fits within an elongated slot 251 (FIG. 6) in the L-shaped latch arm 244 to permit some movement of the bracket 249 with respect to the L-shaped latch arm. Likewise, a bracket 252 (FIG. 7) is attached to the corresponding end of the connecting member 248 to permit the connecting member to be pivotally mounted to the L-shaped latch arm 245 by a pin 253 (FIGS. 7 and 8). The other ends of the connecting members 247 and 248 are mounted to a bracket 254 (FIGS. 6 and 7) extending from the end of the pivot arm 233 to the end of the pivot arm 234. These ends of the connecting members 247 and 248 are provided with threaded portions 255 and 256 (FIGS. 6 and 7), respectively, which are adapted to receive nuts 257 and 258 which allow the effective length of connecting members 247 and 248 to be adjusted. A pair of springs 259 and 260 are mounted on the connecting arms 247 and 248 between the brackets 249 and 252 and the threaded portions 255 and 256, respectively.

Figure 4:
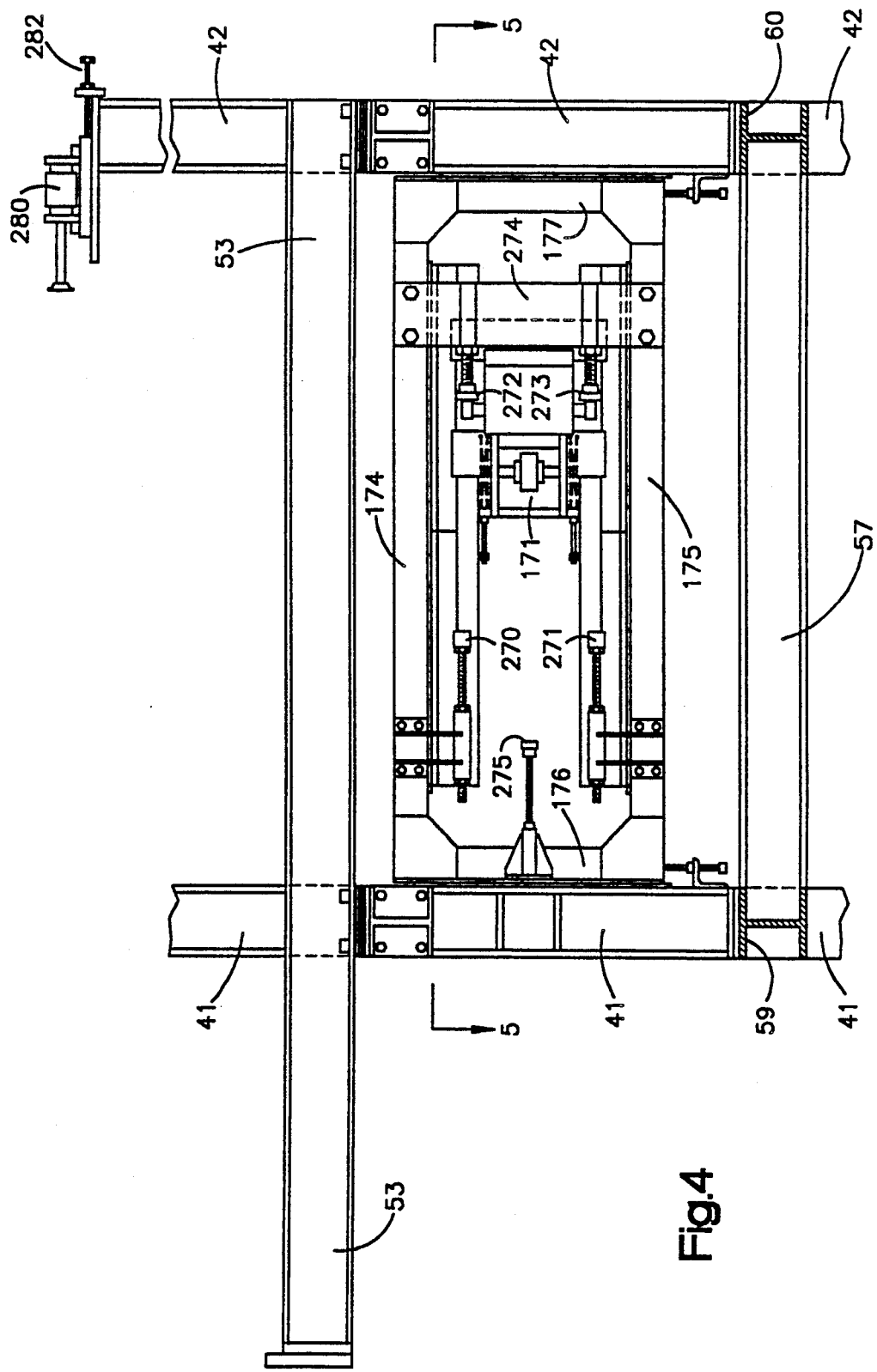
FIG. 4 is a side sectional view showing the drive latch assembly taken along line 4—4 of FIG. 3.

As shown in FIG. 4, a pair of adjustable plungers 270 and 271 are mounted on the lower portion 95 of the loosener frame assembly 90 at one end of the horizontal supports 174 and 175, respectively. The plungers 270 and 271 are positioned so as to engage the bumper stop 231 when the latch carriage 171 is at one end of its travel. Another pair of adjustable plungers 272 and 273 are mounted on the loosener frame assembly 90 on a vertical member 274 extending between the horizontal supports 174 and 175. The plungers 272 and 273 are positioned so as to engage the bumper stops 242 and 243, respective)y, when the latch carriage 171 is st the other end of its travel. In addition to the plungers 270 and 271, a positive safety stop 275 is provided to assure that the drive latch assembly 170 stops after it has completed its length of travel. The safety stop 275 is positioned to engage the side of the latch body 210 and is mounted on the vertical support column 41 between the horizontal supports 174 and 175.

The operation of the drive latch assembly 170 can be seen with reference to FIG. 5. The latch carriage 171 is moved to the right as shown in FIG. 5 by the motor 200, until the bumper stops 242 and 243 engage the plungers 272 and 273, respectively. As the bumper stops 242 and 243 move to the left as shown in FIG. 5, the camming surfaces 246 of the L-shaped latch arms 244 and 245 (FIG. 6) engage the camming plate 239, causing the slide shaft 237 to move outwardly away from the support member 213 in the slot 251 in the latch body 210. This action causes the slide member 222, which is attached to the shaft 237, to move out of the cavity in the latch body 210 so that the track engager 220 moves outwardly to engage the end of one of the vertical tracks 78. As the slide shaft 237 moves outwardly, it pulls the pivot arms 233 and 234, which pivot about the pivot shaft 235 until the pivot arms engage the camming plate 239. The springs 259 and 260 on the connecting members 247 and 248 are compressed, and the assembly is latched in place with the track engager 220 extended outwardly.

As the tables 66, and the forms 64 mounted thereon, are moved through the loosening assembly, the latch carriage 171 is moved along at the same rate until the bumper stop 231 engages the plungers 272 and 273 at the other end of the assembly (on the left as shown in FIG. 5). The engagement of the bumper stop 231 with the plungers 272 and 273 causes the stop to move to the right as shown in FIG. 5. This action forces the pivot arms 233 and 234 (FIG. 6) to pivot about the pivot shaft 235, moving the shaft 237 inwardly toward the support member 213 in the slot 251 in the latch body 210. The slide member 222 is thus retracted into the latch body 210, and the track engager 273 is moved out of engagement with the track 78. At the same time, the movement of the pivot arms 233 and 234 also the causes springs 259 and 260 on the connecting members 247 and 248 to force the L-shaped arms 244 and 245 to the right, as shown in FIG. 5, so that the bumper stops 242 and 243 are in position to engage the plungers 272 and 273. With the track engager 273 disengaged, the latch carriage 171 is now unlatched or released and is free to be rapidly moved back to the starting position or engagement position under power of the motor 200.

As the loosener frame assembly 90 is rapidly moved back to its starting position under power of the motor 200, it must be rapidly decelerated upon reaching the starting position. To assist in this deceleration, a pair of shock absorbers 280 and 281 (FIGS. 1 and 4) are provided on top of the columns 42 and 43 respectively. The position of shock absorbers 280 and 281 is adjustable by means of positioning bolts 282 and 283, respectively. Stopping movement of the loosener frame assembly 90 is also assured by means of safety stops (not shown) mounted beneath the shock absorbers 280 and 281 on the columns 42 and 43.

As previously mentioned, the sprocket wheels 194, 195, 196 and 197 which drive the loosener frame assembly 90 are smaller in diameter than the sprocket wheels 181 and 182 on the drive latch assembly 170 in order for the loosener frame assembly 90 to move at a slower speed than the drive latch assembly and at a slower speed that the form carriage assembly 65. As a result, each pair of loosener scrubbers 115 travels around the periphery of a form 64 as the loosener frame assembly 90 completes its course of travel along the form carriage assembly 65.

The action of the loosener scrubbers can be seen with reference to FIG. 9, which depicts in schematic form top plan views of the relationship of the star-shaped scrubbers 115a and 115b from one of the pairs of looseners 114 with the corresponding form 64 that they engage at six different stages of the loosening operation.

As shown in portion (a) of FIG. 9, the loosening operation begins with one of the pair of scrubbers 115a contacting the front of the form 64. The loosener frame assembly 90 travels at a speed slower than the speed of travel of the form carriage assembly 65, causing the scrubber 115a to roll around the entire circumference of the form 64, as both the loosener frame assembly and the form carriage assembly move in the same direction (to the right as shown in FIG. 9). In portion (b) of FIG. 9 the scrubber 115a is depicted at the midway point of its course around the form 64.

Before the scrubber 115a finishes loosening one side of the form 64, the other scrubber 115b of the pair of scrubbers begins loosening on the other side of the form. Portion (c) of FIG. 9 depicts the engagement of the scrubber 115b with the form 64. Thereafter, the scrubber 115a completes its loosening of one side of the form 64 as shown in portion (d) of FIG. 9.

As shown in portion (e) of FIG. 9, the scrubber 115b finishes its half of the loosening operation at the rear of the form 64. At this point the scrubbers 115a and 115b open or move away from the form 64 through the contact of the cam 143 with the camming plate 144 to prepare for their return to the starting position. The opening of the scrubbers 115 away from the form 64 is shown in portion (f) of FIG. 9.

The coordination of the travel of the looseners 114 and the forms 64 during the loosening operation is controlled by the drive latch assembly 170. As the latch carriage 171 engages the plungers 272 and 273 to engage the latch, the latch carriage is driven along with one of the tracks 78 of the form carriage assembly 66. The loosener frame assembly 90 travels along with the drive latch assembly 170, but at a slower speed due to the difference in size between the sprocket wheels 181 and 182 and the sprocket wheels 194, 195, 196 and 197. When the latch carriage 171 reaches the other end of its course of travel, it engages the plungers 270 and 271 to release the latch carriage from the track 78. The distance between where the latch carriage engages and where the latch disengages can be designated the "total loosening distance," and this represents the distance traveled by the forms during loosening and scrubber opening and is depicted in FIG. 9 as the "form travel during loosening and scrubber opening."

For example, if the forms 64 travel at a maximum speed of 45 ft/min (or 9 in/sec), and the forms are about 6 inches apart (on center), then a form passes by a fixed spot adjacent to the form carriage assembly every 0.667 second.

If the "total loosening distance" is 24 inches, then the forms travel 24 inches during one complete loosening and scrubber opening operation. Of this 24 inches of travel, suppose 4 inches of form travel occurs during scrubber opening, leaving 20 inches of form travel occurring during loosening. At a speed of 45 ft/min (9 in/sec), the forms 64 would traverse the 20-inch loosening path in 2.22 seconds.

Since the looseners 114 begin with one of each pair of looseners at the front of the forms 64 (FIG. 9(a)) and end with the other of each pair of looseners at the rear of the forms (FIG. 9(e)), the looseners do not have to travel as far as the forms travel during this 2.22 seconds. If the forms 64 have a typical diameter of 2.58 inches and the loosener scrubbers 115 have a diameter of 2 inches, it can be determined that the looseners 114 must traverse only 15.42 inches (20 inches minus 2.58 inches minus 2 inches) during this 2.22 seconds. To traverse the 15.42 inches in 2.22 seconds, the looseners must travel at speed of 34.7 ft/min (6.94 in/sec). The sprocket wheels 181, 182, 194, 195, 196 and 197 and the chains 180, 190 and 191 are therefore designed so that, as the latch drive assembly 170 moves at 45 ft/min, the loosener frame assembly 90 travels at a speed of 34.7 ft/min, or 0.77 of the speed of the latch drive assembly.

As shown in FIGS. 9(e) and 9(f), the forms 64 continue to move along during scrubber opening. Suppose the forms 64 travel an additional 4 inches during scrubber opening. At a speed of 45 ft/min (9 in/sec), the scrubber opening operation would take 0.444 seconds. During this 0.444 seconds, the looseners 114, traveling at a speed of 34.7 ft/min (6.94 in/sec), would travel an additional 3.08 inches. Thus the looseners 114 (and the loosener frame assembly 90) would travel a total distance of 18.5 inches (15.42 inches plus 3.08 inches) during loosening and scrubber opening.

For their return to the starting position, the looseners 114 must travel the return distance of 18.6 inches while forms 64 travel forward 6 inches, i.e., while the next form moves into position. At a speed of 45 ft/min (9 in/sec), the forms 64 travel 6 inches in 0.667 sec. The looseners 114 must therefore complete the return travel distance of 18.5 inches in 0.667 seconds, and must therefore travel at speed of 139 ft/min (27.7 in/sec). The motor 200 is connected to the speed reducer 201 to provide a 69 rpm output to the shafts 183 and 202, as previously described. Therefore, the chain drive comprising sprocket wheels 194, 195, 196 and 197 and the chains 192 and 193 should be designed to convert this 69 rpm of the shaft 183 to a linear speed of 139 ft/min (27.7 in/sec) for the loosener frame assembly 90.

During the 2.67 seconds that the looseners 114 perform the loosening and scrubber opening operations and return to the starting position, four forms 64 will have passed the starting point (at 0.667 seconds each). Therefore, four looseners 114 are required for each line of forms, and four forms in each line are loosened during each cycle.

As shown in FIG. 3, three pairs of looseners 114 are provided in each row. To engage four forms 64 in a line, four pairs of looseners 114 (such as shown in FIG. 3) are required in each line, the other three pairs of looseners in the line being directly behind each of the pair of looseners shown in FIG. 3. In addition, to engage the four forms 64 in the other three lines not engaged by these looseners, another four pairs of looseners 114 are needed in each of these three lines, with these additional looseners being offset from the looseners shown in FIG. 3. Altogether then, eight rows of looseners 114 are provided with each row comprising three pairs of looseners (as shown in FIG. 3), for a total of 24 pairs of looseners. The distance between each set of looseners in a line is the same as the distance between the forms 64 in the line, so that all 24 sets of looseners perform the loosening operation simultaneously on 24 forms.

As previously mentioned, the looseners 114 are agitated by the vibrating mechanism powered by the motor 148, preferably at a rate of 230 strokes/min (3.83 strokes/sec). During a 2.22 second loosening operation, loosener scrubbers 115 thus perform 8.52 vibrating strokes.

After the loosening operation has been performed by the loosening assembly, the rubber film around the lower portion of each form no longer adheres to the form, and it is possible to roll up a portion of this film to provide a bead. This rolling-up operation is accomplished by a bead roller assembly which may be seen with reference to FIGS. 10, 11 and 12.

The bead roller assembly is supported on two pairs of vertical support columns 301, 302, 303 and 304, each of which is supported on a base 305, 306, 307 and 308 (FIG. 12), respectively. A horizontal beam 309 (FIGS. 10 and 12) extends between the tops of the columns 301 and 303, and a horizontal beam 310 (FIGS. 10, 11 and 12) extends between the tops of the columns 302 and 304.

Figure 10:
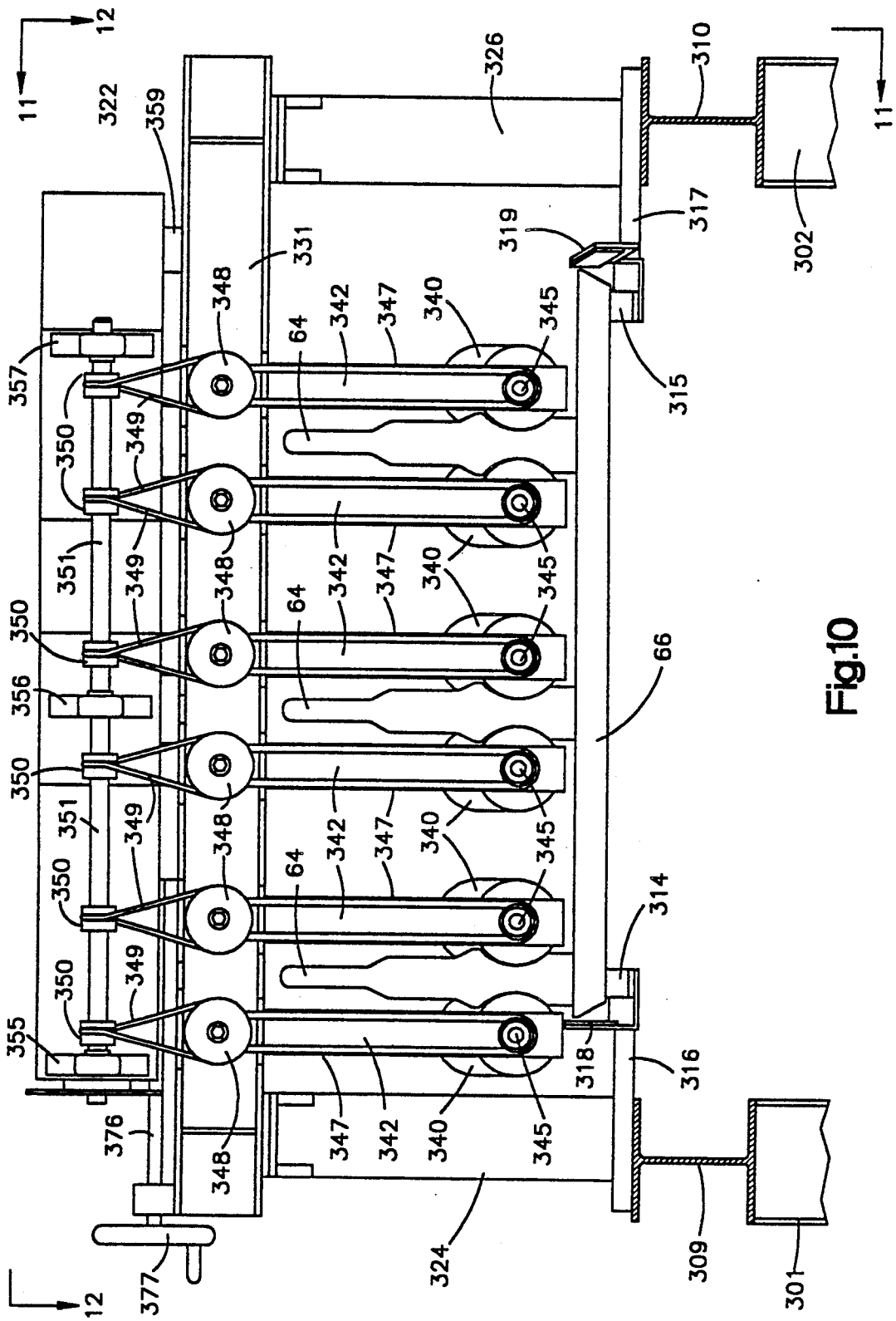
FIG. 10 is an end elevational view of the bead roller assembly of the present invention.

As shown in FIG. 10, the individual glove forms 64 are carried in an upright vertical position on the plurality of narrow slats or tables 66, each of which has six forms 64 arranged in a row. As shown in the embodiment of the present invention, the forms 64 are carried in rows six across, although, as previously mentioned, other configurations could be used. As shown in FIG. 10, the tables 66 are supported on each side on a belt supported on rollers 314 and 315 which are mounted on the edge of vertical flanges 316 and 317 which extend inwardly from the beams 309 and 310, respectively.

Each of the flanges 316 and 317 also supports one of two guide rails 318 and 319 which center the tables 66 and assure alignment of the form carriage assembly 65 as it passes through the bead roller assembly. The guide rail 318 extends vertically upwardly from the flange 316. The guide rail 319 also extends vertically upwardly from the flange 317, but the forward and rearward ends of the guide rail 319 are tilted downwardly and outwardly to assist in guiding the tables 66 into the bear roller assembly.

Figure 11:
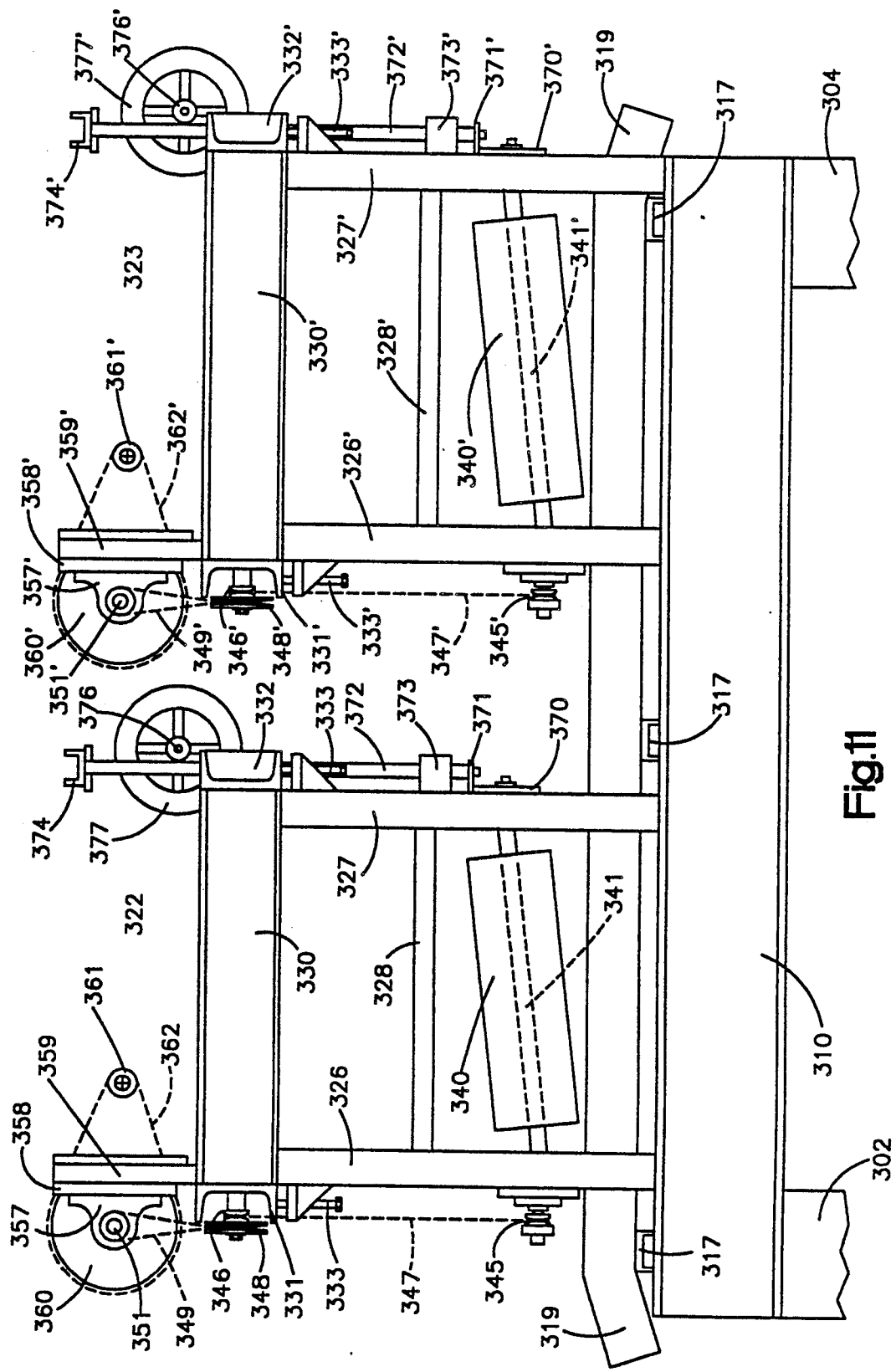
FIG. 11 is a side elevational view of the bead roller assembly taken along line 11—11 of FIG. 10.

As shown particularly in FIGS. 11 and 12, the bead roller assembly consists of two nearly identical units 322 and 323. The first unit 322 first engages three of the forms 64 in each row of six, and the second unit 323 then engages the other three forms in each row.

With reference to the first unit 322, two pairs of vertical supports 324, 325, 326 and 327 (FIGS. 10 and 12) are provided, the vertical supports 324 and 325 extending upwardly from the horizontal beam 309, and the vertical supports 326 and 327 extending upwardly from the horizontal beam 310. Horizontal supports 328 (FIG. 11)

extend between the vertical supports 324 and 325 and between the vertical supports 326 and 327. A horizontal support 329 (FIGS. 11 and 12) extends across the tops of the vertical supports 324 and 325, and a horizontal support 330 extends across the tops of the vertical supports 326 and 327. A front horizontal support beam 331 (FIGS. 10, 11 and 12) extends across the front of the bead roller assembly supported on one end by the vertical support 324 and the horizontal support 329 and on the other end by the vertical support 326 and the horizontal support 330. A similar rear horizontal support beam 332 (FIGS. 11 and 12) extends across the rear of the bead roller assembly supported on one end by the vertical support 325 and the horizontal support 329 and on the other end by the vertical support 327 and the horizontal support 330. The height of the upper portion of the frame comprising the horizontal supports 329, 330, 331 and 332 is adjusted with respect to the lower portion of the frame comprising the vertical supports 324, 325, 326, 327 by adjustment screws 333 (FIG. 11).

The beads are produced on the forms by pairs of roller brushes 340 which engage the lower portion of the forms 64. Three pairs of roller brushes 340 are provided in each unit 322 and 323 to engage three of the forms 64 in each row. As shown in FIG. 11, each of the roller brushes 340 extends diagonally along the side of the forms 64 with the lower end of each roller brush 340 positioned at the forward direction of the line of travel of the forms and the upper end of the roller brush positioned at the rearward direction of the line of travel of the forms. Each of the roller brushes 340 is supported on a rotatable shaft 341 which extends through the roller brush and extends from each end of the roller brush. The front end or lower end of each of the brush shafts 341 is supported for rotation at the lower end of a horizontal support 342 which extends downwardly from the front horizontal support beam 331.

Each of the roller brushes 340 is rotated by a belt drive comprising a pulley 345 (FIGS. 10 and 11) mounted on the front end or lower end of the brush shaft 341, a pulley 346 (FIG. 11) mounted on the front of the front horizontal support beam 332, and a drive belt 347 (FIGS. 10 and 11) extending between the pulleys 345 and 346. A pulley 348 is mounted coaxially with each of the pulleys 346. Each pulley 348 is connected by means of a drive belt 349 (FIG. 10) to a pulley 350 (FIGS. 10 and 12) mounted on a shaft 351 (FIGS. 10, 11 and 12). As shown in FIG. 10, the drive belts 349 for each pair of pulleys 348 are connected to the corresponding pulleys 348 on the shaft 351 in opposite directions, so that as the shaft 351 and the pulleys 350 rotate, the corresponding pair of pulleys 348 are rotated in opposite directions, and the two roller brushes 340 in each pair are likewise rotated in opposite directions.

The shaft 351 is mounted for rotation in supports 355, 356 and 357 (FIGS. 10 and 12) which project horizontally from a vertical plate 358 (FIG. 11) mounted on vertical frame members 359 (FIGS. 10 and 11) and extending above the front horizontal support beam 331. At the end of the shaft 351 is a chain drive comprising a sprocket wheel 360 (FIGS. 11 and 12) connected to a sprocket wheel 361 by means of a drive chain 362. A motor 363 (FIG. 12) drives the sprocket wheel 361, which in turn, rotates the shaft 351. As the shaft 351 rotates, the pulleys 348 are rotated in opposite directions, so that each corresponding pair of roller brushes 340 rotates in opposite directions.

As previously mentioned, each of the roller brushes 340 is mounted to extend diagonally along the side of the forms 64. The lower end or forward end of each roller brush 340 is positioned at the forward direction of the line of travel of the forms and is fixedly mounted in one of the horizontal supports 342. The upper end or rearward end of each roller brush is positioned at the rearward direction of the line of travel of the forms, and is mounted so as to be vertically adjustable depending upon the nature of the rubber articles being produced on the forms 64. The upper end or rearward end of each of the roller brushes 340 is mounted in a vertically movable support 370 (FIG. 11). The upper portion of each support 370 is provided with a flange 371 which is attached to the lower end of a vertically extending adjustment shaft 372. Each adjustment shaft 372 is supported within a sleeve 373 mounted between the vertical supports 325 and 327 and within the rear horizontal support beam 332, so that the shafts 372 are capable of vertical up and down movement within the sleeve 373 and the support beam 332. At the tops of the shafts 372 is a connecting channel 374 (FIG. 11 and 12) to which all six of the shafts are attached. A screw jack 375 (FIG. 12) is mounted beneath the connecting channel 374, and a horizontally extending shaft 376 extends into the screw jack 375. At the other end of the shaft 376 is a hand wheel 377.

As the hand wheel 377 is turned, the shaft 376 rotates, causing the screw jack 375 to move up and down. As the screw jack 375 moves up and down, it moves the connecting channel 374, causing all of the shafts 372 to move up and down. The vertical movement of the shafts 372 results in vertical movement of the flanges 371 and corresponding vertical movement in the rearward ends of all of the roller brushes 340. As a result, the vertical position of the upper end or rearward end of the roller brushes 340 is adjusted and set by turning the hand wheel 377.

As shown in FIGS 11 and 12, the other unit 322 is virtually identical to the unit 319 just described, except that the unit 322 is traverse)y offset from the unit 319 so that its roller brushes 340' engage the other three forms in a row not engaged by the unit 319. Due to the virtual identity between the elements of the units 319 and 322, the elements of the unit 322 are identified with the same reference numbers as the elements of the unit 319 with the addition of a prime (') designation.

In operation, the forms 64 on the tables 66 travel through the bead roller assembly after they have been through the loosening assembly. The forms 64 first travel through the first unit 319. The three pairs of roller brushes 340 in the unit 319 engage three of the six forms 64 in each row of forms, i.e., the first, third and fifth forms in each row. As the roller brushes 340 engage the forms 64, the left roller brush of each pair of roller brushes (as viewed in FIG. 10) rotates counterclockwise, while the right roller brush of each pair rotates clockwise. The rotation of the roller brushes 340 causes the bottom edge of the rubber article on each form 64 to be rolled up into a bead. The amount of material used in making the bead is determined by the height of the rearward end of the roller brushes 340 and this height is controlled using the hand wheel 377 as previously described. After each row of forms 64 passes through the first unit, it enters the second unit 322 in which the rollers 340' engage the forms not engaged in the first unit 319, i.e., the second, fourth and sixth forms in the row, and make a bead identical with that previously made on the other forms.

After the forms have traveled through the bead roller assembly and the beads have been produced as desired, the forms travel into the curing oven where the rubber articles are cured, after which the finished rubber articles are removed from the forms.

While the invention has been shown and described with respect to a particular embodiment thereof, this is for the purpose of illustration rather than limitation, and other variations and modifications of the specific embodiment herein shown and described will be apparent to those skilled in the art, all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. A bead forming assembly for articles on forms moving on a form carriage assembly, comprising:
    a fixed frame through which the form carriage assembly moves;
    means for loosening the articles from the forms, the loosening means including
        a loosener frame assembly supported on the fixed frame and movable in the same direction as the forms are moving on the form carriage assembly, the loosener frame assembly being movable between a starting position and an ending position, and
        a plurality of looseners supported on the loosener frame assembly, each of the looseners positioned for engaging one of the forms;
    drive means for moving the loosener frame assembly from the starting position to the ending position at a speed different from a speed at which the form carriage assembly is moving to allow the looseners to move around the forms as the forms move and loosen the articles from the forms;
    means for returning the loosener frame assembly from the ending position to the starting position;
    a pair of roller brushes supported on the fixed frame and engaging one of the forms, one roller brush on each side of the form, the roller brushes being mounted diagonally with respect to the direction of travel of the forms on the form carriage assembly; and
    means for rotating the pair of roller brushes in opposite directions as the roller brushes engage the form to produce a bead on the article.

2. A bead forming assembly as described in claim 1, wherein the pair diagonally mounted roller brushes each has an upper end and a lower end, the lower end first engaging the form as it moves on the form carriage assembly.

3. A bead forming assembly as defined in claim 2, wherein the position of the upper end of each of the roller brushes is vertically adjustable with respect to the fixed frame.

4. A bead forming assembly as defined in claim 1, wherein the drive means includes a assembly capable of selective attachment to the form carriage assembly.

5. A bead forming assembly as defined in claim 1, wherein the drive means includes a drive latch assembly having a latch carriage for engaging the form carriage assembly when the loosener frame assembly is in the starting position and for releasing from the form carriage assembly when the loosener frame assembly is in the ending position.

6. A bead forming assembly as defined in claim 5, wherein the drive means further includes a first stop located on the fixed frame for engaging the drive latch assembly when the loosener frame assembly nears the starting position to latch the latch carriage into engagement with the form carriage assembly, and a second stop located on the fixed frame for disengaging the drive latch assembly when the loosener frame assembly nears the ending position to release the latch carriage out of engagement with the form carriage assembly and permit the loosener frame assembly to be returned to the starting position by the drive means.

7. A bead forming assembly as defined in claim 5, wherein the drive means further includes:
    a first chain attached to the latch carriage assembly,
    a first sprocket wheel attached to the first chain,
    a shaft upon which the first sprocket wheel is mounted,
    a second sprocket wheel mounted on the shaft, and
    a second chain attached to the second sprocket wheel and to the loosener frame assembly;
the first sprocket wheel having a different diameter than the second sprocket wheel, causing the second chain to move a speed different than the speed of the first chain, so that the loosener frame assembly moves at a speed different than the latch carriage assembly.

8. A bead forming assembly as defined in claim 7, wherein the returning means includes a motor selectively connected to the shaft.

9. A bead forming assembly as defined in claim 5, wherein the form carriage assembly includes tracks that move with the forms, and the latch carriage includes a track engager having fingers to engage one of the tracks.

10. A head forming assembly as defined in claim 9, wherein the fingers on the track engager are biased outwardly into engagement with one of the tracks by springs and wherein the latch carriage includes means for latching the track engager outwardly into engagement with one of the tracks and for releasing the track engager to pull it inwardly out of engagement with the tracks.

11. A bead forming assembly as defined in claim 9, wherein the latch carriage includes a body having a camming plate, a slide shaft supported within the body and attached to the track engager, a pivot arm having a camming surface and attached to the slide shaft, the camming surface of the pivot arm engaging the camming plate to move the slide shaft and the track engager attached thereto.

12. A bead forming assembly as defined in claim 1, including means for moving each of the looseners away from the forms when the loosener frame assembly is near the ending position.

13. A bead forming assembly as defined in claim 12, wherein the means for moving the looseners away from the forms comprises a camming mechanism having a portion on the loosener frame assembly and a portion on the fixed frame.

14. A bead forming assembly as defined in claim 1, comprising in addition means for vibrating the loosener frame assembly and the looseners supported thereby with respect to the fixed frame to assist in loosening the articles from the forms.

15. A bead forming assembly as defined in claim 1, wherein each loosener comprises a pair of scrubbers which contact the lower portion of the form.

16. A bead forming assembly as defined in claim 15, wherein the scrubbers roll around substantially the entire circumference of the form.

* * * * *

UNITED STATES PATENT AND TRADEMARK OFFICE
CERTIFICATE OF CORRECTION

PATENT NO.  : 4,993,935
DATED       : February 19, 1991
INVENTOR(S) : Srbo M. Stevanovich It is certified that error appears in the above-identified patent and that said Letters Patent is hereby corrected as shown below:

Column 4, line 59, "go" should read --90--.
          line 60, "10" should read --40--.

Column 5, line 31, "61" should read --64--.

Column 6, line 64, "(FIG. 6)" should read --(FIG. 5)--.

Signed and Sealed this

First Day of September, 1992

Attest:

DOUGLAS B. COMER

*Attesting Officer*  Acting Commissioner of Patents and Trademarks